United States Patent [19]

Compton et al.

[11] Patent Number: 4,566,340
[45] Date of Patent: Jan. 28, 1986

[54] FORCE TRANSDUCER

[75] Inventors: William H. Compton, Valley View; Joseph M. Likozar, Highland Heights, both of Ohio

[73] Assignee: Comptrol Incorporated, Cleveland, Ohio

[21] Appl. No.: 580,940

[22] Filed: Feb. 16, 1984

[51] Int. Cl.[4] ............................ G01L 5/10; G01L 1/26
[52] U.S. Cl. ................................ 73/862.48; 73/862.52
[58] Field of Search ............ 73/862.48, 862.52, 862.64

[56] References Cited

U.S. PATENT DOCUMENTS 4,287,776  9/1981  Johnson ............................. 73/862.52
4,365,519 12/1982  Hietaranta ......................... 73/862.52

Primary Examiner—Charles A. Ruehl
Attorney, Agent, or Firm—John F. Luhrs

[57] ABSTRACT

A force transducer angularly adjustable about an axis for producing an output signal proportional to the magnitude of an input force. A signal output member, cantilevered from a base through a spring flexure, is provided with a spindle, the center of which lies in the axis, receives the input force. The moment impressed on the flexure by the input force and the resulting displacement of the output signal member from a null or no-load position is a function of the magnitude of the input force and the angular adjustment of the transducer about the axis. Such angular adjustments can be made in-situ without disturbing the spatial position of the spindle.

4 Claims, 4 Drawing Figures

FORCE TRANSDUCER

This invention relates to a transducer generating an output signal corresponding to a force such as weight, or to a physical condition or quantity, the magnitude of which can be translated into a proportional force, such as pressure, temperature, rate of fluid flow, the tension in a continuous strip of material as it passes along a processing line.

Force transducers of the type to which this invention relates comprise, in general, a base and a force receiving member cantilevered from the base through a flexure. A force applied to the force receiving member produces a deflection thereof from a null or no-load position porportional to the magnitude of the applied force. A control couple having relatively movable elements such as an LVDT (Linear Variable Differential Transformer) having one element connected to the force receiving member and the other secured to the base generates an output signal proportional to the deflection of the force receiving member and accordingly proportional to the magnitude of the applied force.

The span of force ranges within which such a transducer can be calibrated is materially limited. As taught by the prior art, however, the span of force ranges within which a transducer can be calibrated is materially expanded by the inclusion of an auxiliary flexure system. Typical systems of this type are illustrated and described in U.S. Pat. Nos. 3,492,865 and 4,387,776.

In contrast to this and as an objective, this invention comprehends a force transducer wherein the span of force ranges within which the transducer can be calibrated is expanded without the inclusion of such an auxiliary flexure system.

It is a further objective of this invention to provide a force transducer wherein the force range can be adjusted in-situ without causing a perturbation in system parameters.

It is a further objective of this invention to provide a force transducer of high accuracy and resolution, a compact design, and suitable for installation in industrial plants such as steel mills, paper mills and the like wherein there is usually present a deleterious atmosphere containing a high degree of pollutants.

These an other objectives of the invention will be apparent as the description proceeds in connection with the drawings, in which.

DETAILED DESCRIPTION

Figure 4:
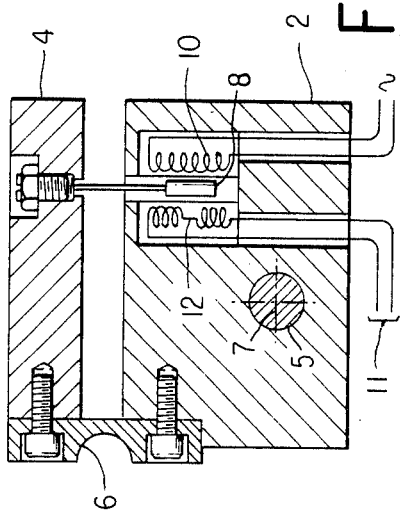
FIG. 4 is a cross-sectional view taken along the line 4—4 in FIG. 3.

Referring now to the drawings there is shown a force transducer applied to the measurement of the tension, maintained by any conventional means, not shown, in a continuous strip of material 20 as it passes along a processing line. The force transducer has a base 2 supported from a wall, machine frame or the like, schematically illustrated at 3, by means of a fastener 5, which when drawn tight causes the transducer to be held in fixed position and when loosened permits angular adjustment of the transducer about the axis 7. Cantilevered from the base 2 through a C-shaped spring flexure 6 is a signal output member, generally indicated at 9, having a top plate 4 and, secured thereto by fasteners 13, a depending face plate 14.

An output signal proportional to the displacement of the top plate 4 from a null or no-load position is generated by a control couple, comprising an LVDT, having an armature 8, adjustably connected to the top plate 4, and primary and secondary coils 10 and 12 respectively housed in the base 2. The output signal present in leads 11 may be utilized to operate suitable readout devices, not shown, such as indicators, recorders, controllers, computers and the like.

The face plate 14 is arranged to receive a spindle 16, the center of which is on the axis 7, of a rotatable pulley 18 over which the material 20 passes. A force F of constant direction, but of variable magnitude, is thereby produced proportional to the tension in the material 20 causing a proportional displacement of the armature 8 and change in the output signal present in leads 11. The face plate 14, as evident, may be adapted to receive a live spindle to which the pulley 18 is secured or a dead spindle about which the pulley 18 rotates.

Figure 1:
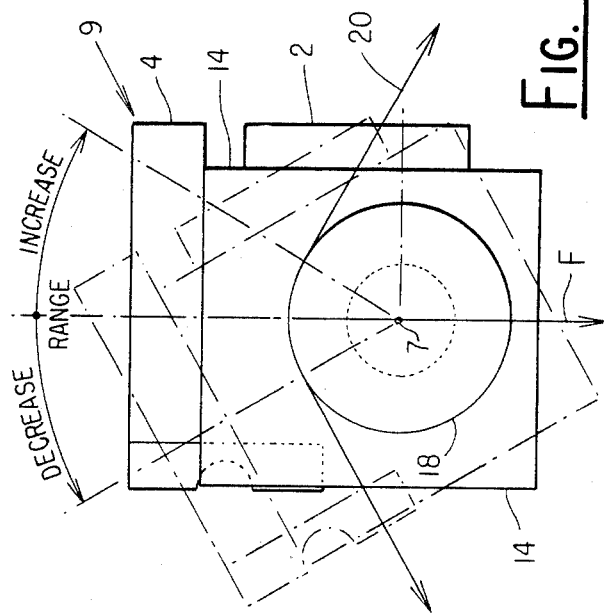
FIG. 1 is a front view of a force transducer in which are incorporated the features of this invention.
Figure 3:
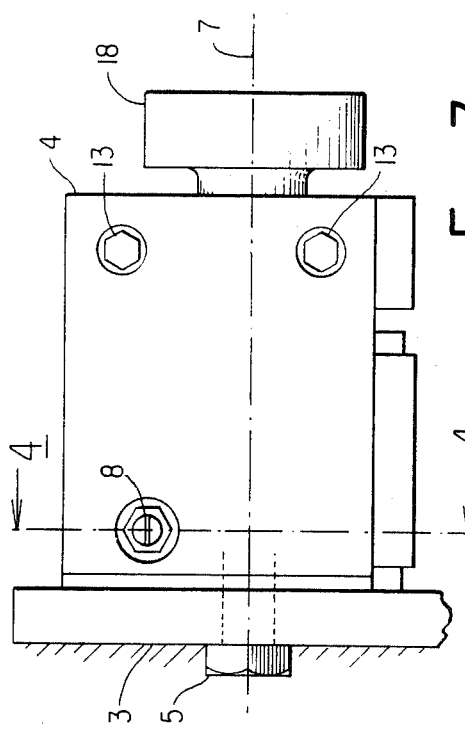
FIG. 3 is a top view of the force transducer illustrated in FIG. 1.
Figure 2:
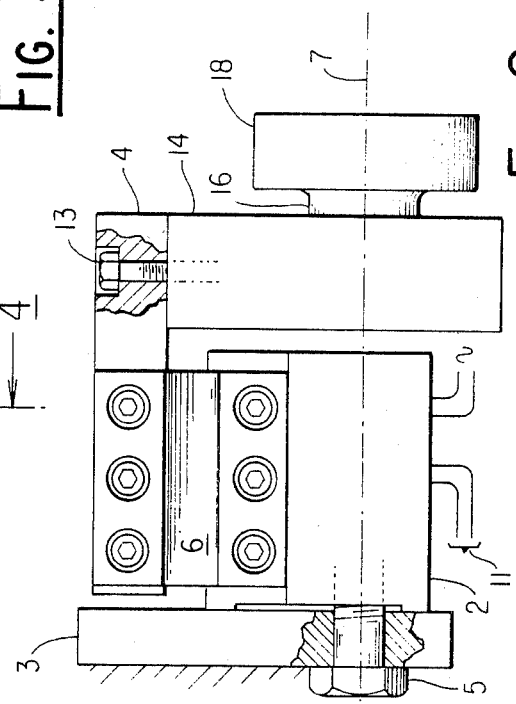
FIG. 2 is a side view of the force transducer illustrated in FIG. 1.

As shown in solid line in FIG. 1 a given force F impresses a discrete moment on the flexure 6. The span of force ranges within which the transducer can be calibrated is materially limited, consideration necessarily being given to such factors as over-stressing of the flexure 6 and displacement of the armature 8 beyond acceptable limits. By angular adjustment of the transducer about the axis 7 the discrete moment produced by the given force F is increased or decreased to materially increase the span of force ranges within which the transducer can be calibrated. Angular adjustment of the transducer about the axis 7 in a counterclockwise direction as shown in FIG. 1 increases the discrete moment produced by the given force F which causes a corresponding decrease in force range. Conversely, angular adjustment of the transducer about the axis 7 in a clockwise direction decreases the discrete moment produced by the given force F which causes a corresponding increase in force range. Thus the force range of the transducer can be adjusted as required to meet the exigencies of a specific application by the simple expedient of an angular adjustment of the transducer about the axis 7.

The spindle 16, centered on the axis 7, permits angular adjustment to be made in-situ without disturbing the spatial position of the spindle 16, thus eliminating the necessity for adjustment in the devices maintaining tension in the material 20.

We claim:

1. In a transducer generating an output signal corresponding to the magnitude of a force, a force receiving member cantilevered through a spring flexure from a base angularly adjustable about an axis whereby the moment impressed on said flexure by a force applied to said force receiving member and the resulting displacement of said force receiving member from a null position is a function of the magnitude of the force and the angular adjustment of the transducer, and a control couple having relatively movable elements operatively connected to said base and force receiving member respectively generating an output signal corresponding to the displacement of the force receiving member from the null position.

2. In a transducer as set forth in claim 1 wherein said force is applied to said force receiving member along a line intersecting said axis and perpendicular thereto.

3. In a transducer as set forth in claim 2 wherein means are provided whereby said force is applied to said force receiving member at the point in said line intersecting said axis.

4. In a transducer as set forth in claim 3 wherein said last named means comprises a spindle receiving the force and the center of which is at the point in said line intersecting said axis.

* * * * *